United States Patent [19]

Geisseler

[11] Patent Number: 4,660,756
[45] Date of Patent: Apr. 28, 1987

[54] METHOD AND APPARATUS FOR PRODUCING A SUBSTANTIALLY CYLINDRICAL HOLLOW ARTICLE

[75] Inventor: Max Geisseler, Ettenhausen, Switzerland

[73] Assignee: Sulzer Brothers Limited, Winterthur, Switzerland

[21] Appl. No.: 808,446

[22] Filed: Dec. 12, 1985

[30] Foreign Application Priority Data

Dec. 14, 1984 [CH] Switzerland .................. 5948/84

[51] Int. Cl.⁴ .............................................. B23K 31/00
[52] U.S. Cl. .................................. 228/184; 219/76.1; 228/48
[58] Field of Search ................. 228/222, 184, 176, 48, 228/119, 125; 219/76.11, 125.11, 60 R, 61, 73.21, 76.14, 76.1

[56] References Cited

U.S. PATENT DOCUMENTS

| | | | |
|---|---|---|---|
| 2,427,350 | 9/1947 | Carpenter et al. | 219/73.21 |
| 3,255,336 | 6/1966 | Purcell | 228/48 |
| 3,480,158 | 11/1969 | Padjiris et al. | 228/48 |
| 4,295,592 | 10/1981 | Schafer | 228/48 |

FOREIGN PATENT DOCUMENTS

| | | | |
|---|---|---|---|
| 0151171 | 11/1981 | Japan | 219/76.1 |
| 0075298 | 5/1982 | Japan | 228/222 |
| 0193281 | 11/1982 | Japan | 219/76.11 |
| 0903052 | 2/1982 | U.S.S.R. | 228/48 |

Primary Examiner—Nicholas P. Godici
Assistant Examiner—Karen Skillman
Attorney, Agent, or Firm—Kenyon & Kenyon

[57] ABSTRACT

The apparatus for the build-up welding of a hollow articles uses at least two rollers for supporting the hollow parent member during application of the build-up welding. The rollers ride on a raceway formed on the hollow parent member.

Where the raceway is also formed of built-up welding, the rollers are provided in pairs with each roller being alternatingly relieved of load to permit build-up of the raceway.

6 Claims, 10 Drawing Figures

METHOD AND APPARATUS FOR PRODUCING A SUBSTANTIALLY CYLINDRICAL HOLLOW ARTICLE

This invention relates to a method and apparatus for producing a substantially cylindrical article. More particularly, this invention relates to a method and apparatus for producing a hollow article using build-up welding.

As is known, various types of techniques have been provided for producing a substantially cylindrical hollow article which arises from the formation of a built-up member on a parent member with the use of build-up welding. Generally, as described in German Patent No. 3300827, the parent member is rotated while the build-up welding is applied. In this regard, the parent member is carried by means of a device which comprises a rotatably mounted drivable bearing or support member and a radially variable intermediate member which connects the bearing member to the parent member. As described in the German Patent, the intermediate member has been constructed of deformable releasable metal section members, in the form of tubes, which are distributed uniformly around the periphery of the bearing member. However, with this system, thermal treatment, i.e. heating and/or cooling, during the build-up process can be provided only externally. Further, when different zones of the hollow member are being heated and cooled simultaneously, coolant may pass from the cooling zone into a zone requiring heat. As a result, the effects which the heating is intended to produce can be disturbed. Still further, the known technique is relatively elaborate and expensive, particularly with respect to the weight of the unit which constitutes the parent member, the intermediate member and the bearing member and which must rotate while build-up welding proceeds.

Accordingly, it is an object of the invention to provide an improved method of producing a hollow article of build-up welding.

It is another object of the invention to improve the thermal treatment of a hollow member during the production of a hollow article from built-up welding.

It is another object of the invention to provide a relatively simple and inexpensive method and apparatus for producing hollow cylindrical articles of built-up welding.

Briefly, the invention provides a method and apparatus for producing a substantially cylindrical hollow article.

In accordance with the method, a hollow parent member is supported directly on at least two rollers and is rotated about a horizontal longitudinal axis while being maintained on the two rollers. In addition, build-up welding is applied to the surface of the hollow member during rotation and support of the hollow member on the two rollers in order to form a built-up member.

Since the hollow member bears directly on the rollers, there is no need to provide a bearing or support member, to locate such a member in a laborious manner or to secure such a member to the parent member.

In order to facilitate the production of the hollow article, the build-up welding may be applied to the hollow parent member to form a circumferential shoulder in order to form a raceway on which a roller may bear. The resulting flange-like shoulder serves to enhance the dimensional stability of the parent member and enables the parent to be relatively thin-walled.

In accordance with the method, the surface of the shoulder may also be machined upstream of the roller in order to provide a smooth running surface for the roller. This provides a factor which reacts advantageously on the accuracy of the hollow member which is to be produced.

The apparatus provided by the invention includes a plurality of pairs of rollers for rotatably supporting a hollow parent member for rotation about a horizontal axis, means for applying build-up welding to the parent member during rotation in order to form a built-up member and drive means connected to at least one of the roller pairs for driving the roller pair in order to rotate the parent member. In addition, a control means is connected to at least one roller pair to alternately maintain one roller of the pair in bearing engagement with the hollow member while relieving the other roller of the pair from bearing engagement with the hollow member.

One particular advantage of the apparatus and method is that, in the absence of any support or bearing member and of an intermediate member for the parent member, most of the interior of the cylindrical hollow member is free during the build-up welding operation. Further, the interior of the hollow member is accessible by way of at least one of the two ends of the hollow member. Thus, the hollow member can be given internal thermal treatment and may be inspected on the inside. Further, shrink stresses associated with the cooling of the hollow member can be avoided in a simple way. Further, prestressed pressure vessels or pressure cylinders can be produced by means of deliberately produced shrink stresses.

The build-up welding may be effected by submerged arc welding. In this case, the welding electrodes may be connected to the negative pole of a d.c. generator while the parent member is connected by way of rubbing contacts to the positive pole of the d.c. generator. This electrical arrangement leads to very high melting rates with a very reduced consumption of powder.

These and other objects and advantages of the invention will become more apparent from the following detailed description taken in conjunction with the accompanying drawings wherein:

Figure 1:
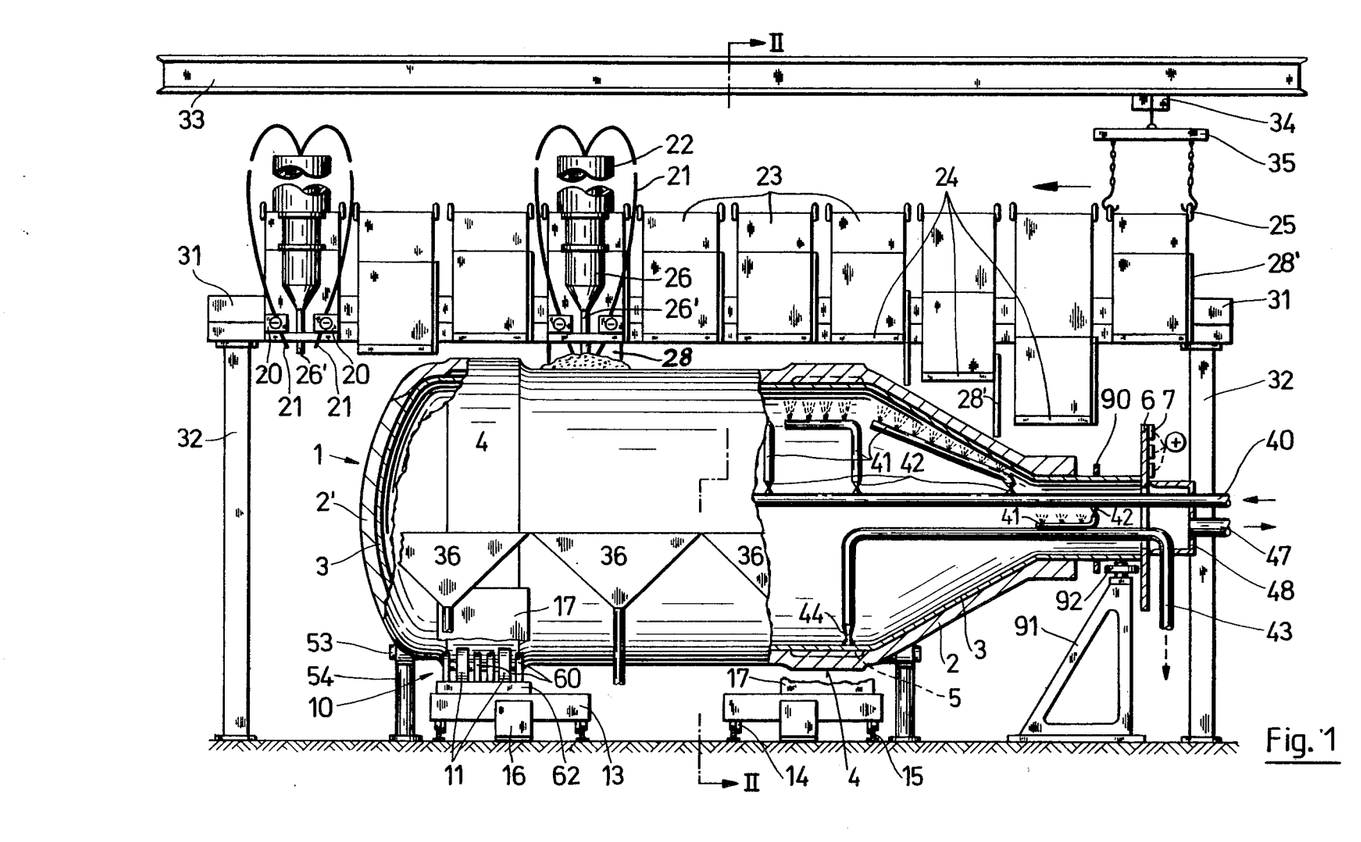
FIG. 1 diagrammatically illustrates an apparatus constructed in accordance with the invention.
Figure 2:
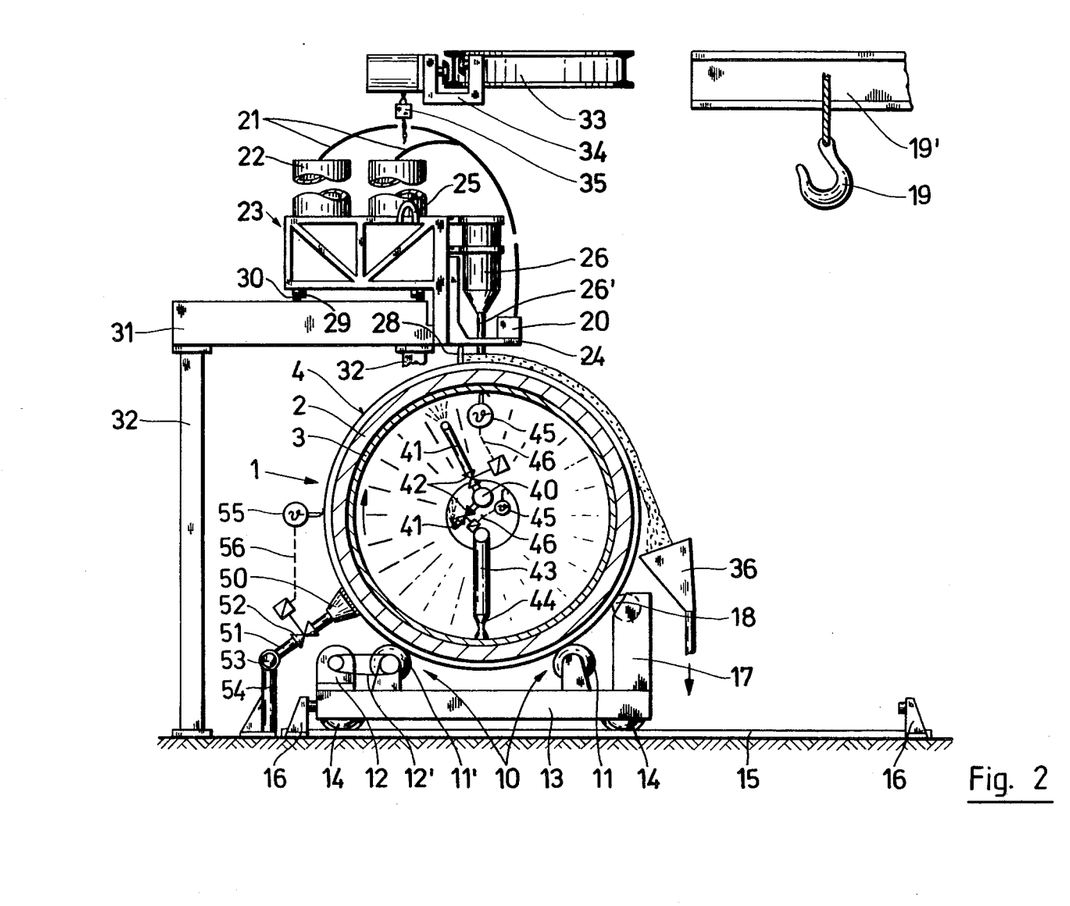
FIG. 2 illustrates a view taken on line II—II of FIG. 1.

Referring to FIGS. 1 and 2, the apparatus is used to produce a cylindrical hollow member 1 which is intended to be used as a thick-walled chemical reactor pressure vessel. As indicated, the hollow member 1 is formed as a result of shaping build-up welding of a build-up member 2 on a parent member 3.

The apparatus includes four pedestals 10, each of which carries a pair of rollers 11, 11'. As indicated in FIG. 2, each pair of pedestals 10 is carried on a carriage 13 which runs via wheels 14 on a pair of tracks 15 disposed on the ground. As indicated in FIG. 1, the rollers 11, 11' are aligned with two raceways 4 on the hollow member 1 so as to carry the weight of the hollow member 1.

A drive means in the form of a variable speed motor 12 is connected to one pair of rollers 11' (see FIG. 2) in order to be driven and, thus, effect rotation of the hollow member 1. As indicated, a chain 12' connects each roller 11' with a corresponding sprocket on the end of the shaft of the motor 12. As indicated in FIG. 2, rotation of the hollow member 1 is clockwise.

A pair of buffer stops 16 are provided at the ends of the tracks 15 (see FIG. 2) in order to limit the distance which any carriage 13 may travel along the tracks 15.

A means such as a grinding machine 17 is also disposed on each carriage 13 with a grindstone 18 in order to machine the raceway 4 upstream of the rollers 11, 11'. Consequently, all zones of the raceway 4 are smoothed before contacting the rollers 11, 11'.

Referring to FIG. 2, a crane 19 which runs on a track 19' covers that zone of the tracks 15 which is to the right in FIG. 2 and serves to manipulate and transport the hollow member 1 before and after the build-up welding.

As indicated in FIG. 1, a vertical flange 90 is secured to the smallest diameter cylinder part of the parent member 3 while a contact disc 6 is positioned parallel to the flange 90. The flange 90 and disc 6 are disposed with a reduced clearance on either side of a guide roller 92 which is rotatably mounted about a vertical axis on a pedestal 91 secured to the ground. This arrangement prevents axial movements of the member 1 during build-up welding but does not restrict movement of the member along the tracks 15.

A means for applying build-up welding is also provided. To this end, the means includes a plurality of pairs of welding heads 20 which are disposed along the highest generatrix of the hollow member 1. In addition, a powder bin 26 is associated with each pair of heads 20 from which welding powder is applied through a tube 26' to the hollow member 1. Welding wire 21 is fed from a wire bin 22 to each head 20. Each pair of heads 20 is mounted on a table 24 adapted to move vertically on a welding carriage 23. The associated wire bins 22 and powder bins 26 are rigidly secured to each carriage 23.

Each carriage 23 is adapted in known manner to adjust the height of the table 24, the tube 26' being in the form of flexible bellows or a flexible hose so that the adjustability of the table 24 in the required range of heights is not impaired. Retaining plates 28 secured to the table 24 prevent the welding powder from trickling away in the opposite direction to the direction of rotation of the hollow member 1. Additional extending retaining plates 28' act conventionally to prevent welding powder from trickling down along the generated surface of the conical part of the hollow member 1.

The carriages 23 run via wheels 29 on straight rails 30 disposed on a platform 31. The platform 31 also serves as a passage giving access by means of vertical supports 32 disposed outside the built-up welding working zone of the hollow member 1. Driving means (not shown), which can be disposed on carriages 23 and on the platform 31 act in known manner to ensure that the carriages 23 advance from the right to the left in FIG. 1 uniformly, horizontally, rectilinearly and adjustably. The number of carriages 23 is such that welding can proceed at the welding heads 20 simultaneously over the whole length of the hollow member 1; two additional carriages 23 are also available. A closed overhead conveyor 33 having a crab 34 which, by means of a cross-member 35 and two chains and hooks, can lift the carriages 23 on eyes 25. The conveyor 33 serves to return the carriages 23 from the left-hand end to the right-hand end of the hollow member 1.

Welding slag and welding powder residues are intercepted by a slag funnel 36 and conveyed therefrom in known manner for removal or re-use. Wire brushes or needle hammers (not shown) are provided to remove caked-on slag residues.

Heating means in the form of gas burners 50 provide preheating of the hollow member 1 necessary for a submerged arc welding. Gas goes from a source (not shown) to a distribution line 53 carried by vertical supports 54. Gas lines 51 connect the burners 50 to the line 53 and comprise gas control valves 52 actuated by way of signal lins 56 by temperature detectors 55 sliding on the outside surface of the member 1 before the welding stations.

Cooling means is of course provided in submerged arc welding to prevent overheating of the workpiece. To this end, cooling can be effected inside the hollow member 1 since the coolant lines can readily extend into the interior of the member 1 at at least one of its two ends. According to FIGS. 1 and 2, demineralized cooling water enters through a cooling water line 40 and is sprayed by way of atomizer nozzles disposed in branch lines 41 on to the inside wall of the member 1. Any water collecting at the bottom of the member 1 is removed by a pump (not shown) through a venturi inlet 44 and a discharge line 43. A blower (not shown) removes the steam evolved from the inside of the member 1 through a steam line 47. The steam line 47 starts from a metal hood 48 which is carried by the lines 40, 43 and which spans the open end of the member 3. The quantity of cooling water is controlled by valves 42 which are disposed in the branch lines 41 and which are actuated through signal lines 46 by the temperature detectors 45 in rubbing contact with the inner or outer wall of the member 1.

From the control engineering point of view, the length of the hollow member 1 is subdivided into approximately 1 meter wide annular parts each acted on by a gas burner 50 and a branch line 41. If required, a single temperature detector per section can be provided to control the valves 42, 52.

So far as the welding is concerned, the welding wires 21 are connected to the negative pole of a d.c. generator (not shown). By way of contacts 7 which rub on the contact disc 6, the disc 6 is conductively connected to the parent member 3, which, in turn, is connected to the positive pole of the d.c. generator. For improved electrical contact, the disc 6 can be cleaned continuously during the build-up welding procedure but, for the sake of simplicity, this feature is not shown in the present case. A seal, preferably a labyrinth seal, is provided between the disc 6 and the hood 48. The kind of electrical energization chosen in the present case has substantial advantages over a.c. submerged arc welding; d.c. welding gives an approximate 50% greater melting rate per hour for an approximately 25% lower welding powder consumption per kilogram of built-up weld material.

Basically, the production of a hollow member as shown in FIGS. 1 and 2 proceeds in the following phases:

The various cylindrical components of the member 3, the conical part and the end are manufactured separately;

A first part 2' of the built-up member 2 is produced on the convex side of the end of the member 3 in known manner by build-up welding;

The components of the member 3 are welded together and placed by means of the crane 19 on the pedestals 10, the axial distance between which is such that the rollers are disposed in the zones corresponding to the subsequent raceways 4. The carriages 13 are then pushed until they abut the buffer stops 16 shown on the left of FIG. 2 so that the member 3 is disposed below the welding heads 20;

The motor 12 is switched on and the chain 12' drives the rollers 11' to rotate the member 3 around its horizontal longitudinal axis. Through the agency of two welding carriages 23 and the associated welding heads 20, powder bins 26 and wire bins 22, two flange-like shoulders 5 approximately 5 millimeters (mm) high are first brought up by welding near the rollers. The d.c. flows from the wires 21 to the contacts 7. The surface continuously being formed anew by build-up welding is machined continuously by the grindstone 18—before the first contact with the rollers 11—so that unevenesses arising from the setting of the molten metal disappear;

The complete build-up of the hollow member 1 then proceeds in the same way as for the production of the shoulders 5, the carriages 23 moving from the right to the left in FIG. 1 and, having issued at the left-hand end of the member 1, being returned by the crab 34 by means of the crosspiece 35 along the overhead conveyor 33 to that end of the member 1 which is on the right in FIG. 1;

The parent member 3 can be removed after welding by means of known machining.

In all the build-up welding work, the gas burners 50 controlled by the temperature detector 55 and the cooling water valves 42 controlled by the detectors 45 maintain the temperature of the hollow member 1 at an optimal level. The fact that the speed at which the member 1 is rotated by means of the variable-speed motor 12 is variable and that the rate of advance of the carriages 23 is adjustable provide further means of optimizing welding parameters. The way in which the carriages 23 are disposed on the platform 31 and the nature of the overhead conveyor 33 with the crab 34 ensure rapid replacement of any defective units without any major disturbance to the welding work.

Vertical adjustment of the tables 24 under the control of the current flowing between, on the one hand, the welding wires 21, and on the other hand, the hollow member 1 simplifies the continuous advance of build-up welding beyond the shoulders 5 and near the end of the hollow member 1 and near the conical part thereof.

Also, known control methods can be used, either by varying the speed of the hollow member 1 or by varying the current, to form the shoulder 5 on the parent member 3 near the raceway 4 simultaneously as the first weld layer is applied to the parent member 3 and to gradually reduce the difference between the diameter of the raceways 4 and the diameter of the remainder of the built-up member 2, so that both have the same diameter at the end of the build-up welding.

Various materials can be chosen for the various layers involved in the building-up of the hollow member so that the properties of the resulting hollow member can be influenced as required. In the embodiment shown in FIGS. 1 and 2, the prefabricated end part 2' of the built-up member 2 and the flange-like shoulders 5—which are also parts of the member 2—can be inserted seamlessly in the subsequently produced part of the member 2.

Figure 3A:
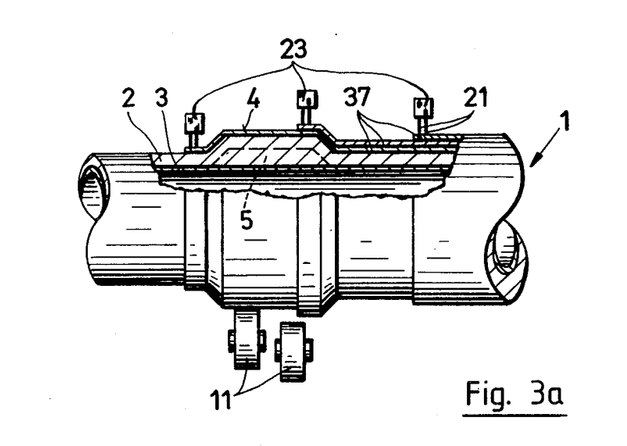
FIG. 3a illustrates a phase during the build-up welding procedure near a raceway of a hollow member in accordance with the method of the invention.
Figure 3B:
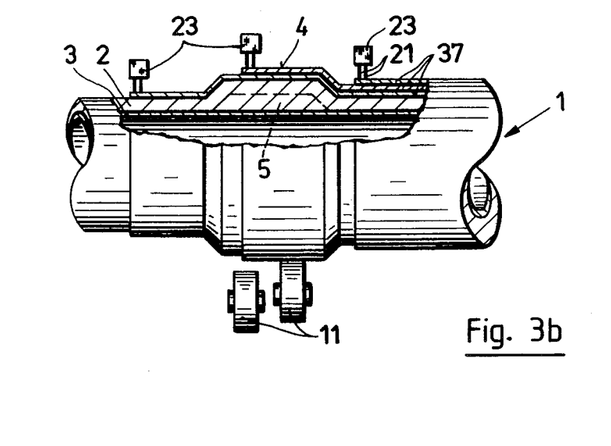
FIG. 3b illustrates a view similar to FIG. 3a during a subsequent phase of welding.

In FIG. 3a, one of the carriages 23 is at the start of one of the raceways 4. The two adjacent carriages 23 are also visible. A fairly thick built-up member or part 2 has already been applied to the parent member 3 and the welding wires 21 of the visible carriages 23 are consecutively welding three more layers 37 to the member 2. The shoulder 5, which by now has been completely integrated in the member 2, is shown in chain lines. In FIG. 3b the carriages 23 have advanced further. The welding wires 21, shown vertical, can be at an inclination so that each wire pair always produces a melt which is optimal for the particular purpose required. As can also be gathered from FIGS. 3a and 3b, the pairs of rollers 11 of the pedestals 10 are connected with a control means such that while build-up welding proceeds near the raceway 4, bearing and support is provided only by that roller 11 in respect of which the raceway width is not at that time being welded.

Figure 3C:
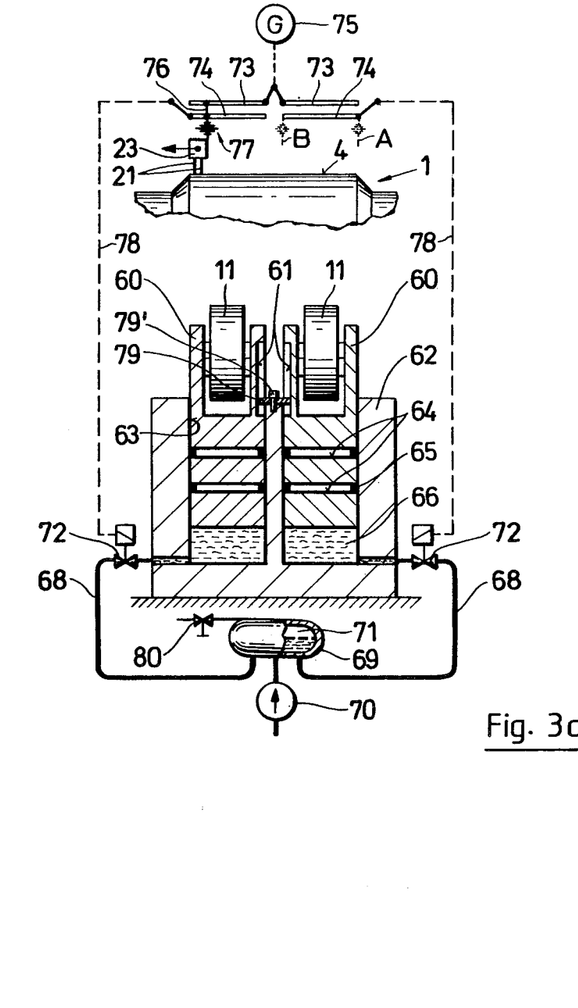
FIG. 3c schematically illustrates a control means for a pair of support rollers in accordance with the invention.

Referring to FIG. 3c, the rollers 11 of a roll pair are rotatably mounted in known manner one each in a vertical clevis 60 whose bottom end engages piston-fashion in a bore 63 in a steel block 62. Each clevis 60 is formed with two horizontal grooves 64, a ring seal 65 being disposed in each such groove. Between the two clevises 60, a flat guide member 79 is secured by a screw 79' to the top end of the block 62; each of the two ends of the guide member 79 slides in a vertical groove 61 in the clevises 60 so that the member 79 can perform limited non-rotating vertical movements. The bottom end faces of the clevises 60 each bound an oil-filled pressure chamber 66 in the block 62. The two oil chambers communicate, in each way by way of an oil line 68 which has a solenoid valve 72, with an oil tank 69 common to the two pressure chambers.

An oil pump 70 supplies pressure oil from a source (not shown) to the tank 69 while an air cushion 71 is disposed above the oil filling to act as a spring. The air cushion 71 can communicate with atmosphere by way of a relief valve 80. The control means includes valves 72 which are of a normally closed (NC) kind and which are connected by means of wiring 78, a bottom busbar 74 and a top busbar 73 to the power supply 75. Secured to each welding carriage 23 by means of an electrical insulator 77 is an electrically conductive rod 76 which, whenever the carriage 23 passes by, interconnects the busbars 73, 74. Each pair of busbars 73, 74 extends over a length of greater than the rolling width of a roller 11.

The valves 72 are normally closed so that the oil or some other incompressible medium in the pressure chamber 66 acts by way of the clevises 60 to press the rollers 11 firmly against the weights acting on them, i.e.

into bearing engagement with the hollow member 1. When the carriage 23 comes near the raceway 4 (point A), the conductive rod 76 short-circuits the busbar pair 73, 74 on the right of FIG. 3c and therefore connects the right-hand valve 72 to the power supply 75. The latter valve therefore opens and the associated pressure chamber is connected to the tank 69. Consequently, the right-hand roller 11 running on that zone of the raceway 4 which is next to be welded bears, because of the air cushion 71, only resiliently on the raceway 4 and provides virtually no bearing or support. The bearing or support effect is taken over completely by the left-hand roller 11 whose valve 72 is still in a closed state. When the carriage 23 leaves the left-hand end of the right busbar pair, the rod 76 interrupts the electrical connection between the two busbars (point B) and de-energizes the right-hand valve 72. This valve 72 closes and the previously resilient roller 11 becomes operative for bearing and support since closure of the valve makes the air cushion 71 ineffective. The operation repeats similarly in the case of the left-hand roller 11 in FIG. 3c when the carriage 23 moves into the zone of the left-hand busbar pair.

Clearly, therefore, when a roller 11 changes over from the resilient state to the bearing state, the instantaneous height of the roller 11 is retained so that the hollow member is not raised and there is therefore no disturbance of welding. All that is necessary to ensure that before the rollers 11 are loaded the oil pressure is so adjusted by means of the oil pump 70 that the clevises 60 are in their top position—i.e., in engagement with the guide members 79. The vertical grooves 61 should be preferably designed to be longer than the complete thickness of the built-up member 2, although the pump may be used during the production of the built-up member 2 to raise the hollow member 1 at intervals and thus to produce a very thick hollow member 1 notwithstanding relatively short grooves 61.

As the clevises 60 descend with increasing diameter of the hollow member 1, the volume of the air cushion 71 gradually decreases so that its resilience is impaired. However, this impairment can readily be compensated for by a-controlled discharge of air by way of the relief valve 80.

Instead of the hydropneumatic system shown in FIG. 3c, the clevises 60 can be retained by friction brakes with the rollers 11 in the bearing state and supported by different kinds of springing, for example, steel springs when the rollers 11 are in the resilient state. The decrease in length of the spring due to the gradual descent of the rollers 11 can be compensated for in known manner, for example, by the spring being lowered, a step which corresponds to the discharge of air by way of the relief valve 80 in FIG. 3c. Consequently, the position of the rotational axis of the hollow member 1 can be maintained in all conditions throughout the entire production process.

Figures 4, 5, 6, 7, 8:
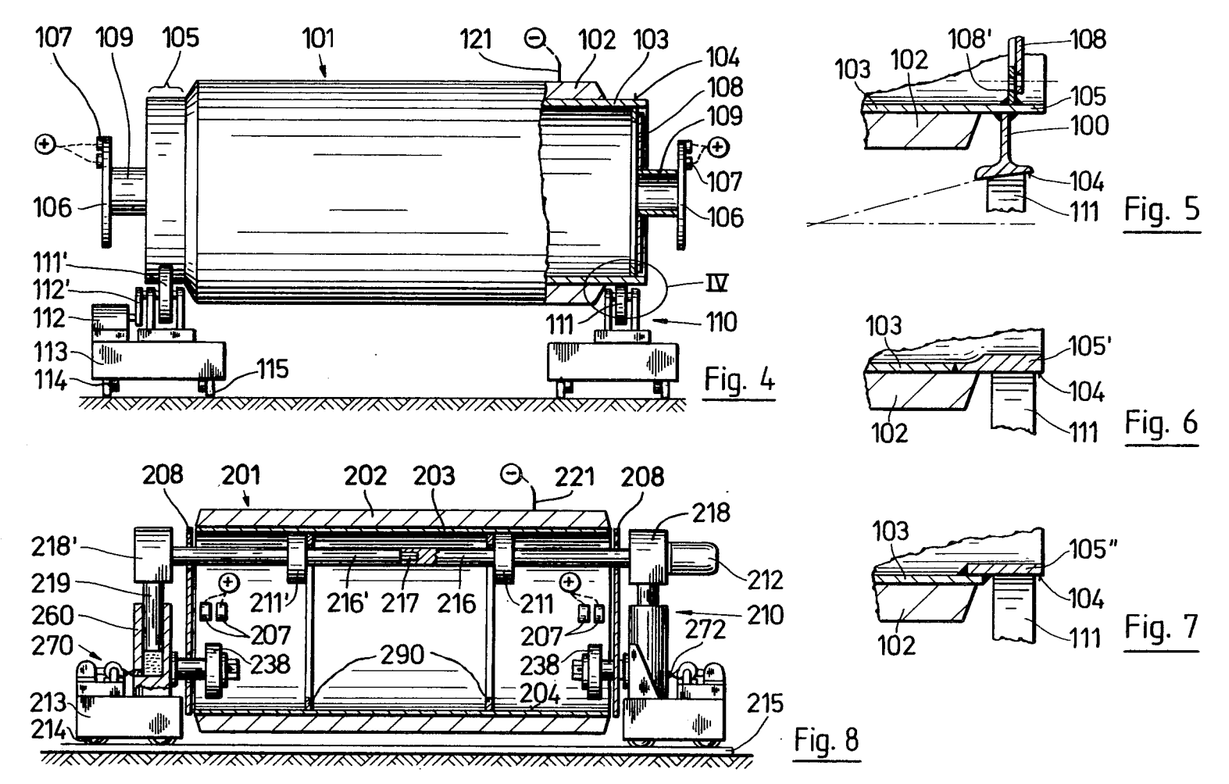
FIG. 4 diagrammatically illustrates a partial view of a modified apparatus for producing a cylindrical hollow member open at both ends in accordance with the invention.
FIG. 5 illustrates a modified support arrangement of detail IV of FIG. 4.
FIG. 6 illustrates a further modified support arrangement of detail IV of FIG. 4.
FIG. 7 illustrates a further modified support arrangement of detail IV of FIG. 4.
FIG. 8 illustrates a diagrammatic view of a further modified apparatus for producing a hollow member open at both ends in accordance with the invention.

Referring to FIG. 4, a parent member 103 of a hollow member 101 which is open at both ends after manufacture is carried on four pedestals 110 two each of which are disposed on spigot-like prolongation 105 of the member 103. The pedestals 110 are conventional devices whose rollers 111, 111' are provided singly—i.e., not in pairs. The pedestals 110 are disposed on carriages 113 running with the interposition of wheels 114 on straight rails 115. A variable-speed motor 112 drives via a chain 112' the roller 111' so that the roller 111' rotates the member 101 around its horizontal longitudinal axis.

The means necessary for the build-up welding of the built-up member 102 are not shown in FIG. 4 since they correspond to those shown in FIGS. 1 to 3b.

Both ends 105 of the member 103 can expand radially when heated and the interior of the member 101 is closed from the outside by means of a disc 108 at each end, the discs 108 being secured by screws to a welded-in ring 108' visible in FIG. 5. By way of a spigot 109 which is disposed at the center of each disc 108 and to which a contact disc 106 is secured flange-fashion, coolant is supplied to the interior of the hollow member 101 and coolant and steam are removed therefrom. This proceeds in the same way as in the embodiments of FIGS. 1 and 2. Similar considerations apply to the supply of direct current, for which purpose rubbing contacts 107 are provided on the two discs 106. Apart from the fact that the construction of the welding installation is simpler because of the greater simplicity of the hollow member 101, the production thereof proceeds as for the production of the hollow member 1 described above.

Axial support for the member 101 is provided by the raceways 104 on which the rollers 111' run being slightly conical. In this regard, the raceway diameter increases from the ends towards the center of the parent member 103 while the diameter of the rolls 111, 111' decreases correspondingly. Referring to FIG. 5, wherein like characters indicate like parts as above, a T-section reinforcing ring 100 is mounted on each prolongation 105 to form a raceway for a roller 111. As shown to an exaggerated scale, the raceway diameter increases towards the center of the hollow member while the roller diameter decreases. Alternatively, as shown in FIGS. 6 and 7, the prolongations 105', 105" can be reinforced on the inside.

Referring to FIG. 8, a hollow member 201 open at both ends is in process of production and is carried on the inside by support rollers 211, 211'. This variant is of use more particularly for relatively short hollow members. Two support or bearing facilities 210 are provided and are each disposed on a carriage 213 running with the interposition of wheels 214 on straight rails 215 common to the two carriages 213. Basically, each support facility comprises a vertical cylinder 260 which is secured to the carriage 213 and in which a piston 219 is arranged in conventional manner for sliding. The bottom zone of the interior of the cylinder 260 communicates by way of a control valve 272 with a pump unit 270 comprising an oil tank, a pump and a driving motor. When the motor is switched on, the pump delivers oil from the tank to the interior of the cylinder 260, so that the piston 219 rises. After the motor has stopped, and the valve 272 has been closed the piston 219 remains at the height reached provided that the valve 272 stays closed. When the valve 272 opens, oil returns to the tank and the piston 219 descends.

A plummer block 218, 218' is secured to the top end of each piston 219 while shafts 216, 216' are rotatably mounted in the blocks 218, 218'. These shafts 216, 216' extend into the hollow member and mount the respective rollers 211, 211' thereon. The driving motor 212 is secured to the block 218 and drives the shaft 216, the shaft being formed with a central hexagonal aperture at the free end. The other Shaft 216' has a central hexagon 217 at the free end which is in sliding fit in the hexagonal aperture in the driven shaft 216.

One bearing roller 238 each is secured to the two carriages 213. The two rollers 238 are disposed opposite one another as referred to the vertical center plane of the hollow member and protect the member from oscillations around the longitudinal axis of the shafts 216, 216'.

Secured in the parent member 203 are two annular axial supports 290 which contact the respective end faces of the rollers 211, 211' near the center of the hollow member 201 and thus prevent axial movement thereof during the building-up welding process. The contacts 207 rub directly on the inside of the parent member 203. Two stationary discs 208 at both ends of the parent member 203 seal the interior thereof from the exterior, seals, preferably labyrinth seals, being provided between the edge of the discs 208 and the end faces of the hollow member 201. As in the other examples cooling water supply and removal lines (not shown) and a steam line extend through the discs 208.

production of the hollow member 201 using the apparatus shown in FIG. 8 starts by the parent member 203 being placed on the rails 215 with its longitudinal axis extending in the direction of the rails 215. The carriages 213 are then pushed towards one another from the two ends—with the pistons 219 retracted into the cylinders 260—until the hexagon 217 of the shaft 216' engages in the hexagonal aperture in the shaft 216 and the free ends of the shafts 216, 216' are pressed against one another. The two carriages 213 are then secured in this position relative to one another, for example, by means of a chain (not shown) which couples the carriages together so that they do not accidentally move apart from one another. The pump units 270 are then started and the pistons 219 rise in synchronism with one another until the rollers 211, 211' have raised the parent member 203 to the required height and the levelling necessary for build-up welding is present, the necessary fine controls being provided by means of the control valves 272. The rollers 238 are then moved in opposite directions until they contact the inside of the parent member 203 and are secured in this position. Next, the axial rings 290 are secured to the parent member 203 by welding or screwing, whereafter the carriages 213 together with the member 203 are moved on the rails 215 until the member 213 is below the welding heads. The built-up member 202 is then built up by build-up welding by the method previously described with reference to FIGS. 1 and 2.

The method according to the invention can be used with processes other than submerged arc welding, for example, in the TIG method. A current other than direct current can be used and direct current poled the opposite way round can also be used. The build-up welding method according to the invention can be used to build up not only the relatively simple hollow members shown but also to build up spigots, reinforcing ribs and other parts differing from the basic cylindrical shape on the hollow member. As an example of one such possibility, FIGS. 1 and 2 show the formation of the shoulders 5 which project from the otherwise smooth surface of the built-up member 2. Computerized control of the method and apparatus according to the invention can provide complete automation even for very complex hollow member shapes.

It is often advantageous to simplify the removal of the parent member upon completion of build-up welding by making the hollow member in two cylindrical parts. Even then the invention provides substantial advantages over the prior art since, in addition to obviating an additional support member, the place of division can be located in the least stressed central zone of the cylindrical hollow member.

For increased operational reliability it is recommended that solenoid valves 72 in FIG. 3c and the control valves 272 in FIG. 8 be arranged with redundance in series and/or parallel.

The hollow member can be preheated by heat sources other than the gas burners 50, for instance, by infra-red radiators.

What is claimed is:

1. An apparatus for producing a cylindrical hollow member comprising
    at least one pair of rollers for rotatably supporting a hollow parent member thereon for rotation about a horizontal axis thereof;
    a plurality of clevises, each said clevis rotatably mounting a respective one of said rollers thereon;
    a block slidably receiving each clevis thereon and defining a pressure chamber with each clevis;
    a control means connected to at least one roller pair to alternatively maintain one roller of said roller pair in bearing engagement with the hollow member while relieving the other roller of said roller pair from bearing engagement with the hollow member; said control means including a tank for a liquid pressure medium, a pair of lines extending from said tank, each said line being connected to a respective pressure chamber in said block, a pair of valves, each said valve being disposed in a respective line to control a flow of pressure medium therethrough, a pump for pumping liquid pressure medium into said tank while maintaining an air cushion above the pressure medium and a third control valve connected to said tank to exhaust air from the air cushion;
    means for applying build-up welding to the hollow member during rotation of the hollow member to form a built-up member; and
    drive means connected to at least one of said roller pairs for driving said one roller pair to rotate the hollow parent member.

2. An apparatus for producing a cylindrical hollow member comprising
    at least one pair of rollers for rotatably supporting a hollow parent member thereon for rotation about a horizontal axis;
    means for applying build-up welding to said hollow member during rotation of the hollow member to form a built-up member; and
    a control means connected to said pair of rollers to selectively maintain one roller in a bearing state relative to the hollow member while maintaining the other roller in a resilient state relative to the hollow member, said control means including a tank for receiving a liquid pressure medium while maintaining an air cushion above the pressure medium, a pump connected to said tank for pumping liquid pressure medium into said tank, a pair of pressure chambers, each chamber being disposed below a respective roller, a pair of lines, each said line being connected to and between said tank and a respective pressure chamber to convey pressure medium therebetween, a pair of control valves, each said valve being disposed in a respective line to selectively open said line to place a respective roller in a resilient state and close said line to place said respective roller in a bearing state, and a third control valve connected to said tank to exhaust air from the air cushion whereby opening of one of said pair of valves permits the respective roller to descend under an increasing diameter of the built-up hollow member.

3. An apparatus as set forth in claim 2 which further comprises cooling means for cooling the hollow member internally and heating means for heating the hollow member externally to maintain the hollow member at an optimum level.

4. An apparatus as set forth in claim 1 which further comprises retaining means for retaining the hollow member axially of said axis during rotation thereof.

5. An apparatus as set forth in claim 1 which further comprises means for machining the surface of the welding applied to the hollow member upstream of said rollers.

6. An apparatus as set forth in claim 1 which further comprises cooling means for cooling the hollow member internally and heating means for heating the hollow member externally to maintain the hollow member at an optimum level.

* * * * *

UNITED STATES PATENT AND TRADEMARK OFFICE
CERTIFICATE OF CORRECTION

PATENT NO. : 4,660,756

DATED : April 28, 1987

INVENTOR(S) : Max Geisseler

It is certified that error appears in the above-identified patent and that said Letters Patent is hereby corrected as shown below:

```
Column 2, line 41 "powder" should be -power-
Column 3, line 9  "build-up" should be -built-up-
Column 4, line 32 "lins" should be -lines-
Column 8, line 52 "stopped, and" should be -stopped and-
Column 8, line 53 "closed the" should be -closed, the-
Column 9, line 18 "production" should be -Production-
```

Signed and Sealed this

Seventeenth Day of November, 1987

*Attest:*

DONALD J. QUIGG

*Attesting Officer*  *Commissioner of Patents and Trademarks*